US009489742B2

(12) United States Patent
Han et al.

(10) Patent No.: US 9,489,742 B2
(45) Date of Patent: Nov. 8, 2016

(54) APPARATUS, METHOD AND COMPUTER-READABLE RECORDING MEDIUM FOR DETECTING MOVING OBJECT USING DEPTH MAP

(71) Applicants: Samsung Electronics Co., Ltd., Gyeonggi-do (KR); Dong-A University Research Foundation for Industry-Academic Cooperation, Busan (KR)

(72) Inventors: Jeong-Ho Han, Seoul (KR); Jung-Seop Kim, Seoul (KR); Bong-Soon Kang, Busan (KR); Hyun-Joong Kang, Busan (KR); Kyoung-Hoon Jang, Busan (KR); Ho-Sang Cho, Busan (KR)

(73) Assignees: Samsung Electronics Co., Ltd (KR); Dong-A University Foundation for Industry-Academic Cooperation (KR)

( * ) Notice: Subject to any disclaimer, the term of this patent is extended or adjusted under 35 U.S.C. 154(b) by 168 days.

(21) Appl. No.: 14/295,962

(22) Filed: Jun. 4, 2014

(65) Prior Publication Data

US 2014/0355831 A1 Dec. 4, 2014

(30) Foreign Application Priority Data

Jun. 4, 2013 (KR) ........................ 10-2013-0064133

(51) Int. Cl.
*G06T 7/20* (2006.01)
*G06K 9/00* (2006.01)
*G06K 9/20* (2006.01)
*G06T 7/00* (2006.01)

(52) U.S. Cl.
CPC ........... *G06T 7/0081* (2013.01); *G06T 7/0091* (2013.01); *G06T 7/2053* (2013.01); *G06T 2207/10028* (2013.01)

(58) Field of Classification Search
None
See application file for complete search history.

(56) References Cited

U.S. PATENT DOCUMENTS

| 6,819,796 | B2 * | 11/2004 | Hong | G06T 7/0081 358/464 |
|---|---|---|---|---|
| 8,374,423 | B2 * | 2/2013 | Lee | G06K 9/00335 382/103 |
| 2003/0156756 | A1 * | 8/2003 | Gokturk | G06F 3/017 382/190 |
| 2004/0175035 | A1 * | 9/2004 | Kameyama | G06T 7/2006 382/173 |
| 2008/0107307 | A1 * | 5/2008 | Altherr | G06T 7/2006 382/107 |
| 2008/0273751 | A1 * | 11/2008 | Yuan | G06K 9/32 382/103 |
| 2011/0142289 | A1 * | 6/2011 | Barenbrug | G06T 7/0081 382/107 |
| 2012/0087540 | A1 * | 4/2012 | Chen | G06K 9/00335 382/103 |
| 2013/0084006 | A1 * | 4/2013 | Zhang | G06T 7/0087 382/173 |

* cited by examiner

*Primary Examiner* — Matthew Bella
*Assistant Examiner* — Jose M Torres
(74) *Attorney, Agent, or Firm* — The Farell Law Firm, P.C.

(57) ABSTRACT

An apparatus, a method and a non-transitory computer-readable recording medium for detecting a moving object using a depth map is provided. The apparatus includes a segment image generator unit that generates a segment image to distinguish each object using a depth image of a current input frame; a background image generator unit that generates a current background image by applying a moving average method to the depth image and a background image of a previous input frame; and a moving mask generator unit that generates a moving mask by comparing the depth image with the current background image to thereby find moving parts in the depth image.

21 Claims, 13 Drawing Sheets
(4 of 13 Drawing Sheet(s) Filed in Color)

APPARATUS, METHOD AND COMPUTER-READABLE RECORDING MEDIUM FOR DETECTING MOVING OBJECT USING DEPTH MAP

PRIORITY

This application claims priority under 35 U.S.C. §119(a) to Korean Patent Application Serial No. 10-2013-0064133, filed in the Korean Intellectual Property Office on Jun. 4, 2013, the entire content of which is incorporated herein by reference.

BACKGROUND OF THE DISCLOSURE

1. Field of the Disclosure

The present disclosure relates generally to an apparatus for detecting a moving object, and more particularly, to an apparatus for detecting a moving object using a depth map.

2. Description of the Related Art

Recently, in studies about Human-Computer Interfaces (HCI), techniques of controlling computers without auxiliary devices such as mouses, keyboards, remote controllers, or the like are being developed. Therefore, the technologies of motion recognition, which allows for non-contact interaction with various devices using a hand gesture or a body gesture, is drawing attention. One motion recognition method detects a moving object to be used for the motion recognition. To this end, the technology for splitting an input image into a foreground and a background is important.

In the conventional technology of detecting a moving object, Mixture of Gaussians (MoG) is used for modeling a background in order to split the background from the foreground. MoG is a method for modeling a brightness histogram at the location with one-dimensional Gaussians. Input data may be expressed as the sum of a plurality of Gaussian distribution functions. For example, m-dimensional MoG modeling for input data may be expressed as a linear combination of Gaussian probability density functions.

However, MoG modeling requires a large number of operations for processing each pixel of input data, and is limited when processing in real time.

SUMMARY

The present disclosure has been made to address at least the problems and disadvantages described above, and to provide at least the advantages described below. An embodiment of the present disclosure provides an apparatus, a method and a computer-readable recording medium for detecting a moving object using a depth map by which a moving object can be extracted using a depth image and a still background image can be eliminated.

Further, an embodiment of the present disclosure provides an apparatus, a method and a computer-readable recording medium for detecting a moving object using a depth map which can reduce misdetection that occurs in the process of detecting a moving object due to noise components in a background image and a depth image.

In accordance with one aspect of the present disclosure, an apparatus for detecting a moving object using a depth image includes a segment image generator unit that generates a segment image to distinguish each object using a depth image of a current input frame; a background image generator unit that generates a current background image by applying a moving average method to the depth image and a background image of a previous input frame; and a moving mask generator unit that generates a moving mask by comparing the depth image with the current background image to find moving parts in the depth image.

In accordance with another aspect of the present disclosure, a method for detecting a moving object using a depth image includes generating a segment image to distinguish each object using a depth image of a current input frame; generating a current background image by applying a moving average method to the depth image and a background image of a previous input frame; and generating a moving mask by comparing the depth image with the current background image to find moving parts in the depth image.

In accordance with a further aspect of the present disclosure, a non-transitory computer-readable recording medium is provided having recorded thereon, a computer program for executing a method of detecting a moving object using a depth image. The method includes generating a segment image to distinguish each object using a depth image of an current input frame; generating a current background image by applying a moving average method to the depth image and a background image of a previous input frame; and generating a moving mask by comparing the depth image with the current background image to find moving parts in the depth image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
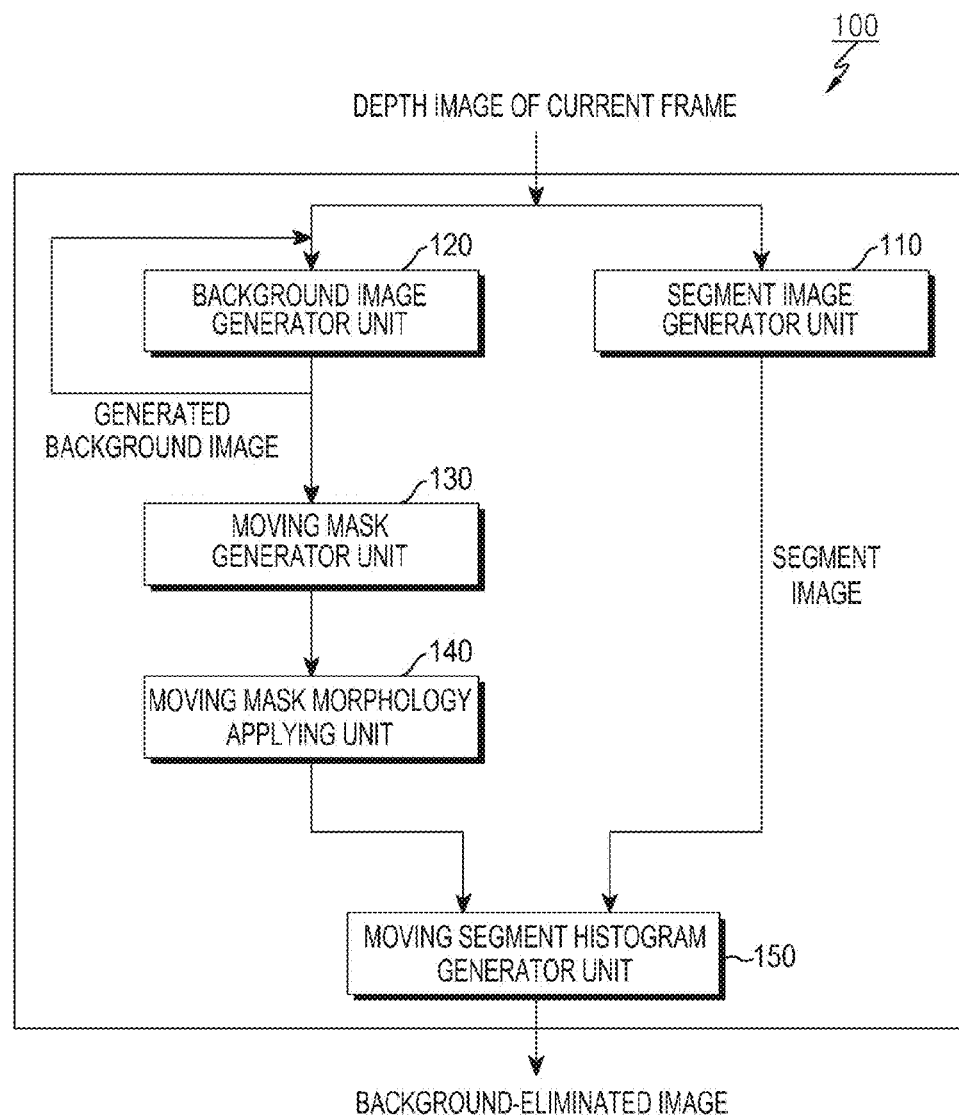
FIG. 1 is a block diagram illustrating an apparatus for detecting a moving object using a depth map, according to an embodiment of the present disclosure.

Embodiments of the present disclosure are described in detail below with reference to the accompanying drawings. The embodiments of the present disclosure are sufficiently described in detail such that those skilled in the art may carry out the present disclosure. It should be understood that although various embodiments of the present disclosure are different from each other, they need not be mutually exclusive. For example, in regard to an embodiment, specific forms, structures, and characteristics described herein be realized through another embodiment without departing from the spirit and scope of the present disclosure. Moreover, it should be understood that locations or arrangements of separate elements within the disclosed embodiments can be changed without departing from the spirit and scope of the present disclosure. Accordingly, detailed descriptions which will be given below are not intended to be restrictive, and the scope of the present disclosure, if properly described, should be limited only by the accompanying claims and equivalents thereof. Similar reference numerals shown in the drawings denote members performing an identical or similar function in several aspects.

FIG. 1 is a block diagram of an apparatus for detecting a moving object using a depth map, according to an embodiment of the present disclosure.

Referring to FIG. 1, an apparatus 100 for detecting a moving object using a depth map according to an embodiment of the present disclosure includes a segment image generator unit 110, a background image generator unit 120, a moving mask generator unit 130, a moving mask morphology applying unit 140, and a moving segment histogram generator unit 150.

The segment image generator unit 110 distinguishes each object in a current frame by using a depth image of an input current frame prior to detecting a moving object in the apparatus 100 for detecting a moving object using a depth map according to an embodiment of the present disclosure. The segment image generator unit 110 generate a segment image by which each object is distinguished in a depth image of a current frame using a labeling algorithm.

For example, the segment image generator unit 110 generates a segment image to distinguish each object by using an input of a depth image of a current frame and an input of a depth image of a previous frame. Here, in order to distinguish each object, if a difference of distance between each of the pixels in the depth image of the current frame is less than or equal to a predetermined threshold, the pixels are recognized to belong to the same object. However, if a difference of distance between each of the pixels in the depth image of the current frame is greater than a predetermined threshold, the pixels are recognized to belong to the different objects, respectively, so each object is distinguished in the depth image of the current frame. Accordingly, the segment image by which each object is distinguished is generated. The generated segment image is used as an input signal to the moving segment histogram generator unit 150 for detecting a moving object, which will be described in greater detail below.

The background image generator unit 120 generates a current background image reflecting a depth image of a current frame by performing a moving average method or a running average method with respect to a depth image of an input current frame and a preceding background image that is generated and fed back in a previous frame. The preceding background image that is fed back to the background image generator unit 120 is a previous background image of a previous frame output from the background image generator unit 120.

In addition, the preceding background image is output from the moving mask morphology applying unit 140 and is fed back to the background image generator unit 120.

The background image generator unit 120 generates a preceding background image of a previous frame on the basis of a first input frame and a second input frame because there is no generated background image at the beginning, which may be used for the third frame of the next input. For example, in order to generate a preceding background image at the beginning, a depth image of a first input frame is stored in a temporary storage space. A preceding background image of a previous frame is generated by performing a moving average method with respect to a depth image of the stored first input frame and a depth image of a second input frame. Here, the generated background image of the previous frame is fed again as an input signal to the background image generator unit 120.

In addition, the background image generator unit 120 allots a value of each pixel having a depth value of "0" in a depth image of an input current frame as a maximum value. Accordingly, the moving mask generator unit 130 described below eliminates an afterimage phenomenon and noise components, which might be generated when detecting a moving mask at the point having an allotted depth value of "0".

Further, after the background image generator unit 120 allots each pixel having a depth value of "0" in a depth image of an input current frame as a maximum value, the background image generator unit 120 generates a current background image by applying a moving average method, such as Equation (1), below to the depth image of the current frame in which each pixel having a depth value of zero is allotted as a maximum value and the preceding background image.

$$B_i(x, y) = \begin{cases} D_i(x, y), & \text{if } i = 1 \\ \alpha \times B_{i-1}(x, y) + (1 - \alpha) \times D_i(x, y), & \text{otherwise} \end{cases} \quad (1)$$

In Equation (1), $B_i$, $B_{i-1}$ and $\alpha$ denote a current background image, a preceding background image, and a weighted value, respectively, and $D_i$ denotes a depth image of a current frame in which each pixel having a depth value of "0" is allotted as a maximum value. Here, $\alpha$ is a weighted value between the preceding image and the depth image of the current frame in which each pixel having a depth value of "0" is allotted as a maximum value. The weight may be altered using a as needed. Further, the weighted value $\alpha$ may is a sensitivity value that is adjustable by a user.

The moving mask generator unit 130 generates a moving mask by detecting moving areas using a difference between a current background image received by the background image generator unit 120 and a depth image of a current frame in which each pixel having a depth value of "0" is allotted as a maximum value. In detecting the moving areas, if a difference between the current background and the depth image of the current frame, in which each pixel having a depth value of "0" is allotted as a maximum value, is more than a predetermined threshold, "1" is allotted as a value of the moving mask. Otherwise, "0" is allotted as a value of the moving mask, as shown in the Equation (2) below, to detect the moving areas. Accordingly, a mask generated in the moving mask generator unit 130 includes information of the moving areas having values of "0" and "1".

$$\text{mov\_mask}_i(x, y) = \begin{cases} 1, & \text{if } B_i(x, y) - D_i(x, y) > \text{diff\_th} \\ 0, & \text{otherwise} \end{cases} \quad (2)$$

In the Equation (2), mov_mask$_i$, and $B_i$ denote a moving mask and a current background image, respectively, and $D_i$ denotes a depth image of a current frame in which each pixel having a depth value of "0" is allotted as a maximum value. Further, diff_th denotes a threshold. Here, diff_th is a predetermined threshold that may be set by a user.

The moving mask morphology applying unit 140 applies morphology operations to a moving mask received from the moving mask generator unit 130 to generate a moving mask applied with the morphology. Here, noise components are eliminated through the morphology operations, so the moving areas can be precisely extracted. Here, the morphology operations may be at least one of an erosion operation, a dilation operation, an opening operation, a closing operation, a top hat operation, a well operation, a morphology gradient operation, and a smoothing operation. For example, in order to eliminate noise components and precisely extract the moving areas, the moving mask morphology applying unit 140 emphasizes a moving area that is condensed and eliminates a moving area that is spread out such as noise by applying an opening operation among the morphology operations to a moving mask generated by the moving mask generator unit 130 so that the moving mask can be estimated more precisely than the moving mask that is not applied with the morphology operations.

The moving segment histogram generator unit 150 samples the moving mask applied with the morphology, which is received from the moving mask morphology applying unit 140, and the segment image received from the segment image generator unit 110 to generate histograms corresponding to moving parts in the depth image. The moving segment histogram generator unit 150 determines a moving segment through the generated histograms and outputs an image from which the background is eliminated. For example, histograms of the same coordinate values of the segment image may be generated with respect to an area that is determined to be a moving area to be allotted as "1" in the moving mask applied with the morphology.

Here, segment values of a segment in which the number of histograms is equal to or more than a predetermined threshold are determined to be a moving segment to be output. Segment values of a moving segment in which the number of histograms is less than a predetermined threshold are determined not to move and not to be output. Accordingly, since a moving mask and a segment image of a moving object similarly overlap each other, the moving segment is detected. In addition, a ratio of sampling performed by the moving segment histogram generator unit 150 is adjustable. Accordingly, noise components can be eliminated by adjusting the ratio of sampling.

Figure 2:
FIG. 2 illustrates an example of a segment image generated by a segment image generator unit, according to an embodiment of the present disclosure.

FIG. 2 illustrates a segment image generated by a segment image generator unit, according to an embodiment of the present disclosure.

Referring to FIG. 2, a segment image generator unit 110 according to an embodiment of the present disclosure generates a segment image, such as that shown in FIG. 2, by which each object can be distinguished through a labeling algorithm with respect to a depth image of an input current frame.

Figure 3:
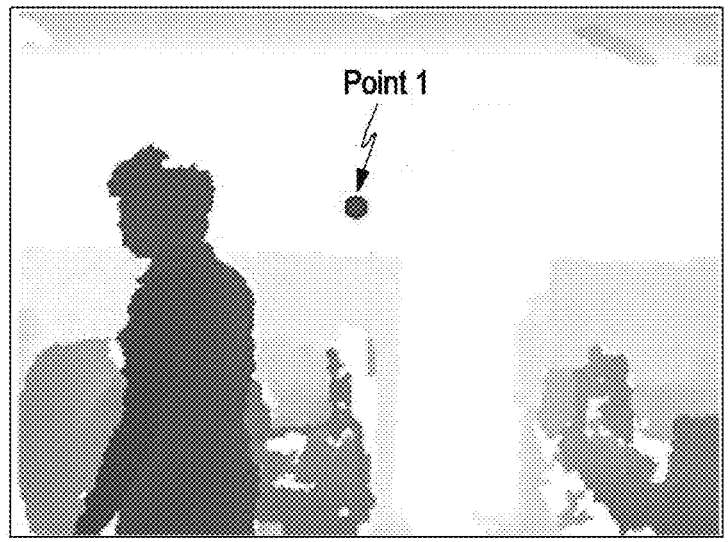
FIG. 3 illustrates an image in which a background image generator unit allots a maximum value to a pixel having a depth value of "0" in a depth image of an input current frame, according to an embodiment of the present disclosure.

FIG. 3 illustrates an image in which a background image generator unit allots a maximum value to a pixel having a depth value of "0" in a depth image of an input current frame according to an embodiment of the present disclosure.

Referring to FIG. 3, a background image generator unit 120, according to an embodiment of the present disclosure, allots a value of each pixel having a depth value of "0" in a depth image of an input current frame as a maximum value.

Figure 4:
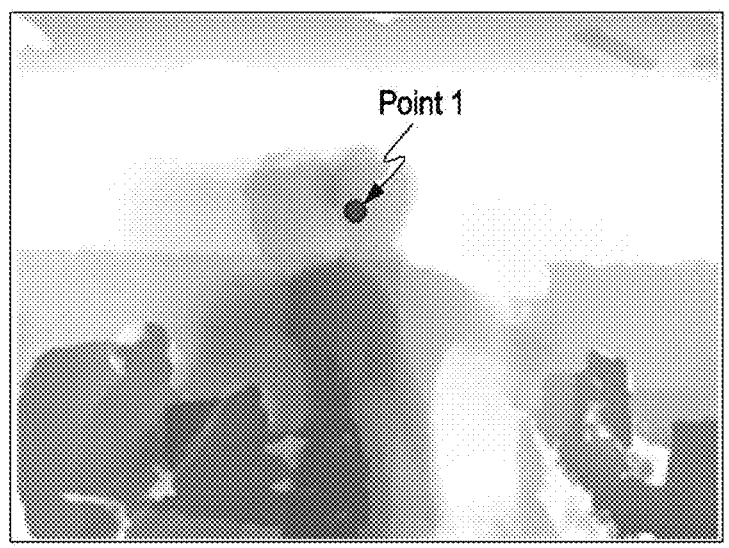
FIG. 4 illustrates a current background image that is generated by a background image generator unit, according to an embodiment of the present disclosure.

FIG. 4 illustrates a current background image that is generated by a background image generator unit, according to an embodiment of the present disclosure.

Referring to FIG. 4, a background image generator unit 120, according to an embodiment of the present disclosure, generates an image, such as that shown in FIG. 4, by applying a moving average method to a depth image of a current frame and a preceding background image.

A general movement detecting apparatus adopting a moving average method determines a movement by comparing a difference between a background image and an image of an input current frame with an absolute value. However, since the background image generator unit 120, according to an embodiment of the present disclosure uses a feature of a depth image of an input current frame, the present disclosure has an advantage over noise components when detecting a moving object.

Figure 5:
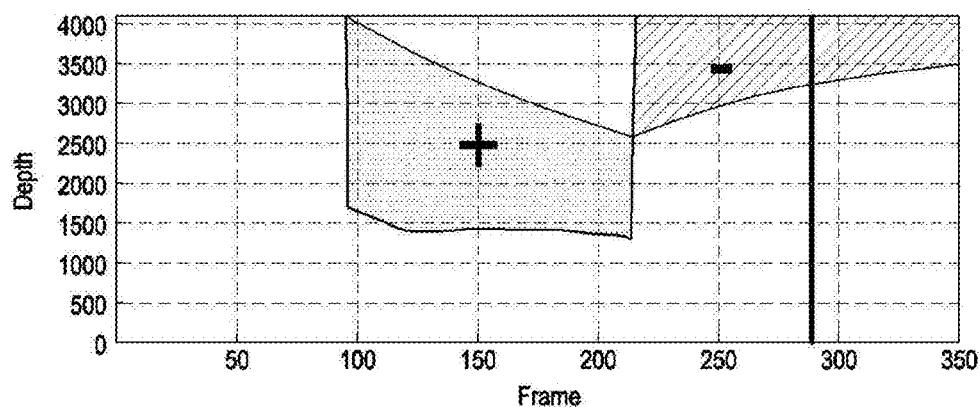
FIG. 5 is a graph in which a pixel of point 1 in a depth image of a current frame and a pixel of point 1 in a current background image are expressed on the time axis, according to an embodiment of the present disclosure.

FIG. 5 is a graph in which a pixel of point 1 in a depth image of an input current frame and a pixel of point 1 in a current background image are expressed on the time axis according to an embodiment of the present disclosure.

Referring to FIG. 5, a moving mask generator unit 130 expresses a certain pixel (Point 1) in a depth image of a current frame, as shown in FIG. 3, and a certain pixel (Point 1) in a current background image, as shown in FIG. 4, that is generated by the background image generator unit 120 on the time axis. The certain pixels (Point 1) of FIG. 3 and FIG. 4 are pixels at the same point.

Since the general movement detecting apparatus detects a movement by comparing a difference between a background image and an input image with an absolute value, when a moving object stays at a certain coordinate and then disappears, if the background image approaches the value of the object again, the afterimage effect occurs. Contrarily, the moving mask generator unit 130, according to an embodiment of the present disclosure, eliminates the afterimage effect by taking values only when a difference between a background image and an input image is positive, as shown in FIG. 5. Accordingly, the precision of detecting a moving object can be enhanced.

Figure 6:
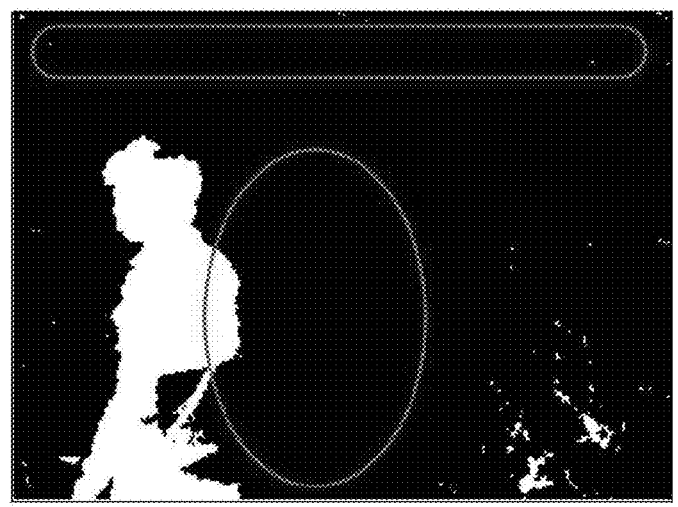
FIG. 6 illustrates an image obtained by eliminating a noise and an afterimage from a mask image generated by a moving mask generator unit, according to an embodiment of the present disclosure.

FIG. 6 illustrates an image in which noises and afterimages are eliminated from a mask image generated by a moving mask generator unit according to an embodiment of the present disclosure, by means of a general method.

Referring to FIG. 6, the moving mask generator unit 130 eliminates the afterimage effect by taking values only when a difference between the background image and the input image is positive, as shown in FIG. 5, to generate the image of FIG. 6. However, although the moving mask generator unit 130 eliminates most of afterimage effects and noises of a moving mask image, noises at the boundary of objects might not be eliminated.

Figure 7A:
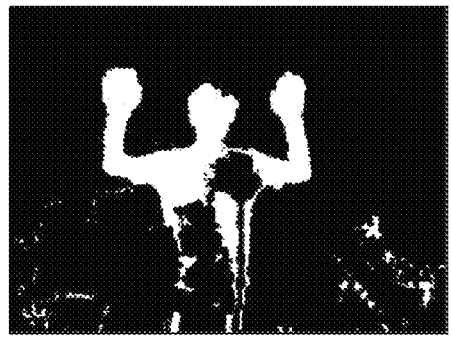
FIG. 7A illustrates a mask image generated by a moving mask generator unit, according to an embodiment of the present disclosure.
Figure 7B:
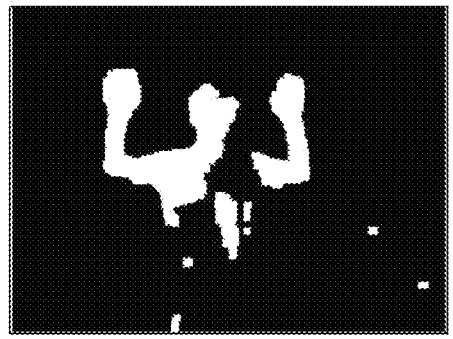
FIG. 7B illustrates an image from which a moving mask morphology applying unit eliminates a noise and an afterimage, according to an embodiment of the present disclosure.

FIG. 7A illustrates a mask image generated by a moving mask generator unit according to an embodiment of the present disclosure. FIG. 7B illustrates an image from which a moving mask morphology applying unit eliminates a noise and an afterimage, according to an embodiment of the present disclosure.

Referring to FIG. 7A, the illustrated image is a mask image generated by the moving mask generator unit 130 to which moving mask morphology has not yet been applied. As shown in FIG. 7A, noise components are not eliminated and exist at the boundary between objects. Accordingly, the moving mask morphology applying unit 140 eliminates noise components at boundaries between objects by applying an opening operation of 5×5 among the morphology operations to the mask image generated by the moving mask generator unit 130, as shown in FIG. 7B. Although the opening operation of 5×5 is used as a mask of the morphology operations, an apparatus for detecting a moving object using a depth map, according to an embodiment of the present disclosure, performs the morphology operations using masks of various sizes.

Figure 8A:
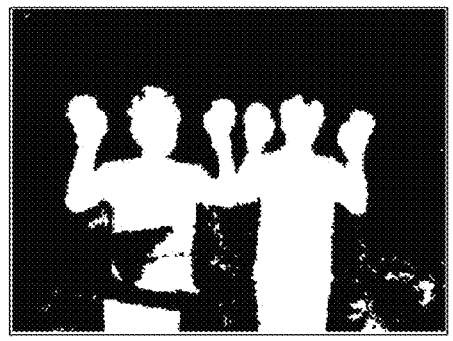
FIG. 8A illustrates a moving mask image that is applied with morphology operations, according to an embodiment of the present disclosure.
Figure 8B:
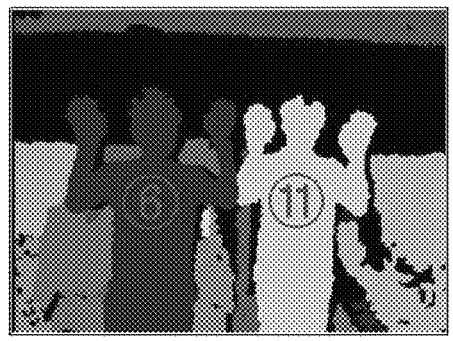
FIG. 8B illustrates an image allotted with the moving segment number in a segment image, according to an embodiment of the present disclosure.

FIG. 8A, illustrates a moving mask image that is applied with morphology operations by a moving mask morphology applying unit, according to an embodiment of the present disclosure. FIG. 8B illustrates a segment image allotted with the number of a moving segment by a segment image generator unit, according to an embodiment of the present disclosure.

Referring to FIG. 8A, an image of a moving mask that is applied with morphology operations by a moving mask morphology applying unit 140 is illustrated.

Referring to FIG. 8B, a segment image that is input in the same frame as FIG. 8A is given the number of a moving segment by the segment image generator unit 110. Since a moving mask and a segment image of a moving object similarly overlap each other, a moving segment can be detected.

Figure 9:
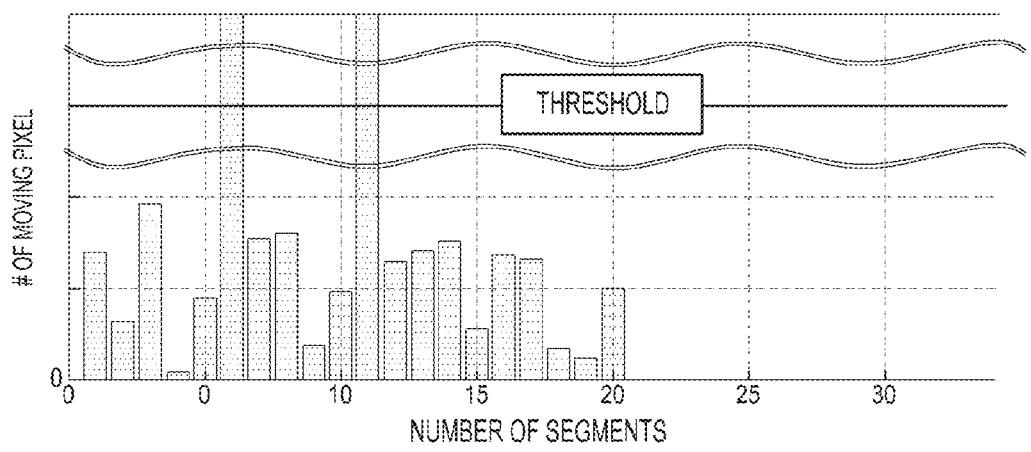
FIG. 9 is a graph of histograms generated by a moving segment histogram generator unit, according to an embodiment of the present disclosure.

FIG. 9 is a graph of histograms generated by a moving segment histogram generator unit, according to an embodiment of the present disclosure. Referring to FIG. 9, after histograms of a moving segment are generated, a moving object is detected by detecting the number of a moving segment that has more histograms than a predetermined threshold.

The apparatus is illustrated in the drawing to show that each element thereof can be separated functionally and logically, which does not always mean that the elements are physically separate or implemented by separate codes.

Further, each generator unit and each applying unit (or elements) of the present specification may be implemented by a functional and structural combination of hardware and software to operate the hardware in order to achieve the technical concept of the present disclosure. For example, each of the function units may mean a logical unit of predetermined codes and hardware resources for performing the predetermined codes, and it will be easily inferred by those skilled in the art that each function unit does not merely mean physically connected codes or a single type of hardware.

Figure 10:
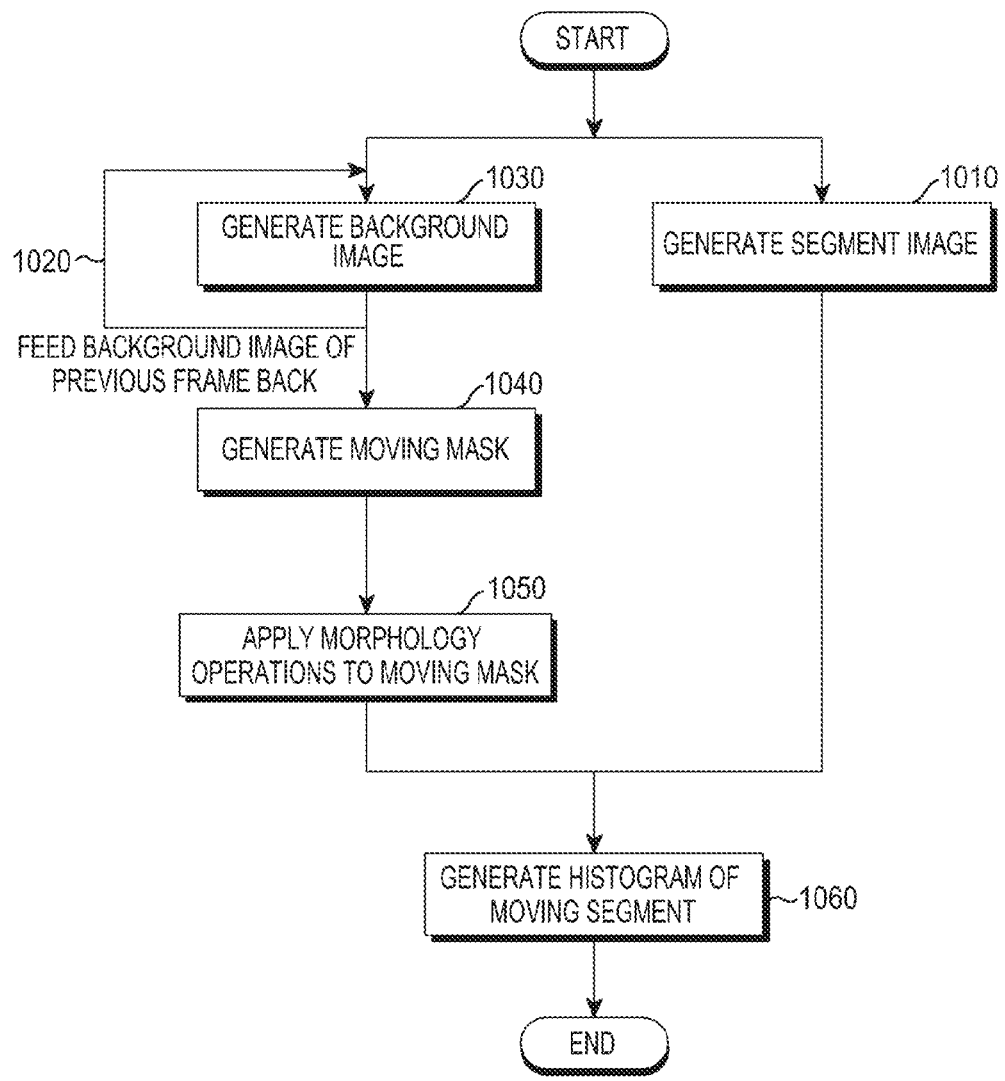
FIG. 10 is a flowchart illustrating a procedure of data processing in a method for detecting a moving object using a depth map, according to an embodiment of the present disclosure.

FIG. 10 is a flowchart illustrating a procedure of data processing in a method for detecting a moving object using a depth map according to an embodiment of the present disclosure.

Referring to FIG. 10, the segment image generator unit 110 receives an input of a depth image of an input current frame. A labeling process is performed with respect to the depth image of the input current frame to generate a segment image by which each object can be distinguished in operation 1010. In operation 1060, the generated segment image is used as an input signal in the process of generating histograms of a moving segment, as described in greater detail below.

In addition, the segment image by which each object can be distinguished will be described in detail later with reference to FIG. 11.

The operation of the background image generator unit 120 is processed concurrently with the operation 1010. In operation 1030, the background image generator unit 120 generates a background image of a previous frame on the basis of the depth image of the input current frame, and in operation 1020, the generated background image is fed back as an input signal to the background image generator unit 120. The generation of the background image of the previous frame will be described in greater detail below with reference to FIG. 12.

In operation 1030, the background image 120 receives the depth image of the current frame and the background image of the previous frame that is fed back, and performs a moving average method to generate a current background image, reflecting the depth image of the current frame, to be output. The current background image reflecting the depth image of the current frame is described in greater detail below with reference to FIG. 13.

In addition, in operation 1030, the background image generator unit 120 performs a process of allotting a maximum value to each pixel having a depth value of "0" among depth images of the input current frame before the generation of the current background image.

In operation 1040, a moving mask generator unit 130 receives the current background image output from the background image generator unit 120 and the depth image of the current frame in which each pixel having a depth value of "0" is allotted as a maximum value, and calculates a difference of values between both pieces of data. If the difference of values is more than a predetermined threshold, "1" is allotted as a value of the moving mask. On the contrary, if the difference of values is less than or equal to a predetermined threshold, "0" is allotted as a value of the moving mask. Accordingly, the moving mask generator unit 130 generates a moving mask that is a binary image including information of moving areas with the values of "0" and "1" to be output. The moving mask will be described in greater detail below with reference to FIG. 14.

In operation 1050, a moving mask morphology applying unit 140 receives the moving mask output from the moving mask generator unit 130, and performs morphology operations to eliminate noise components to generate a moving mask applied with the morphology to be output. The moving mask applied with the morphology will be described in greater detail below with reference to FIG. 15.

In operation 1050, the moving mask morphology applying unit 140 performs at least one morphology operation such as an erosion operation, a dilation operation, an opening operation, a closing operation, a top hat operation, a well operation, a morphology gradient operation, and a smoothing operation.

In operation 1060, a moving segment histogram generator unit 150 receives the moving mask applied with the morphology output from the moving mask morphology applying unit 140 and the segment image output from the segment image generator unit 110. The moving segment histogram generator unit 150 samples the received moving mask applied with the morphology and the segment image to generate each histogram of segments corresponding to moving parts in the dept image. At this time, segment values of each generated segment, which have a number of histograms greater than or equal to a predetermined threshold, are determined to be moving segments, and then an image from which a background is eliminated is output. Segment values of moving segments, which have a number of histograms less than a predetermined threshold, are determined to not move, and then an image from which a background is eliminated is output.

Figure 11:
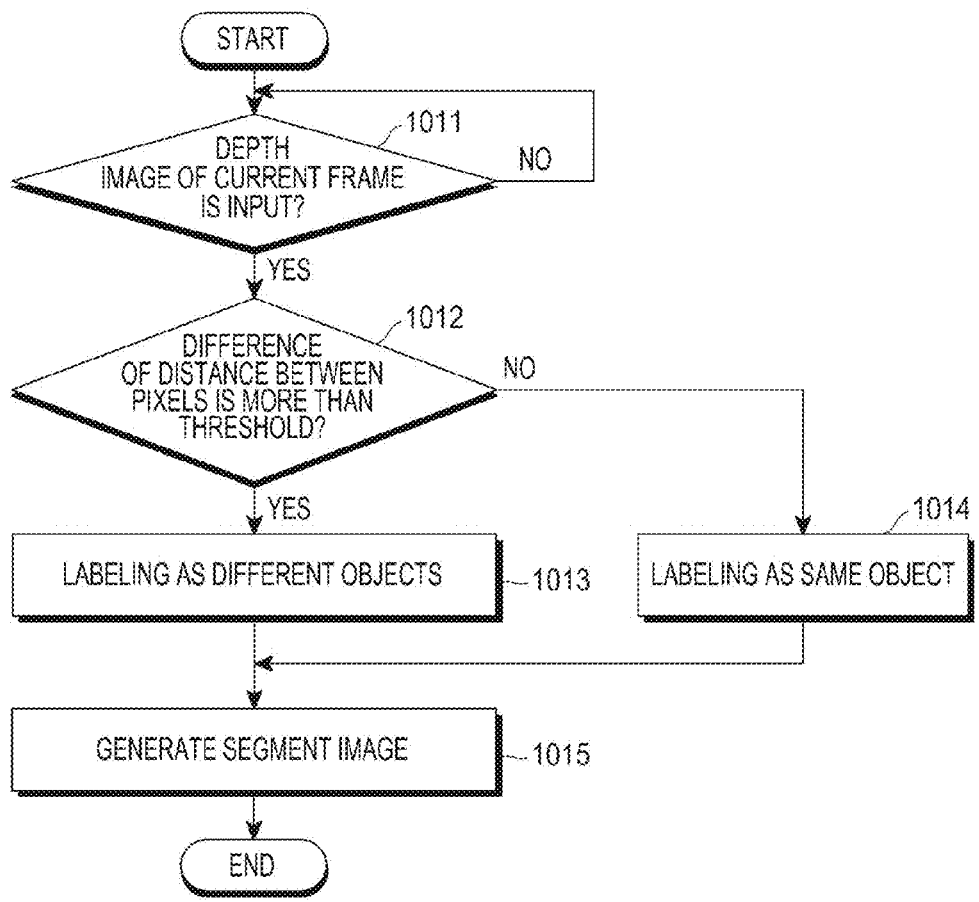
FIG. 11 is a flowchart illustrating a procedure of data processing of a segment image generator unit, according to an embodiment of the present disclosure.

FIG. 11 is a flowchart illustrating a procedure of data processing of a segment image generator unit, according to an embodiment of the present disclosure.

Referring to FIG. 11, in operation 1011, a segment image generator unit 110 determines whether a depth image of a current frame is input. If a depth image of a current frame is not input, the segment image generator unit 110 waits for an input of a depth image.

If a depth image of a current frame is input, in operation 1012, it is determined whether a difference of distance between pixels of the depth image of the input current frame is more than a predetermined threshold. If the distance between the pixels is more than a predetermined threshold, then in operation 1013, the pixels are recognized to be separate pixels that belong to different objects and are then labeled accordingly. If the distance between pixels is less than or equal to a predetermined threshold, then in operation 1014, the pixels are recognized to belong to the same object and are then labeled accordingly. Accordingly, in operation 1015, a segment image by which each object can be distinguished is generated by using the depth image 1024, shown in FIG. 12, of the input current frame.

Figure 12:
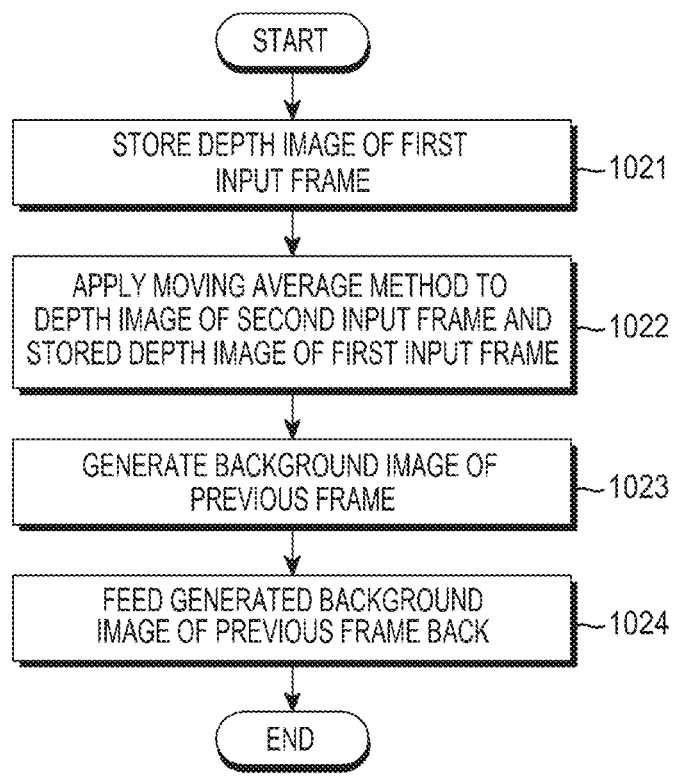
FIG. 12 is a flowchart illustrating a procedure of data processing of a background image generator unit with respect to a background image of a previous frame, according to an embodiment of the present disclosure.

FIG. 12 is a flowchart illustrating a procedure of data processing of a background image generator unit with respect to a background image of a previous frame, according to an embodiment of the present disclosure.

Referring to FIG. 12, in operation 1021, a background image generator unit 120 stores a depth image of a first input frame in a temporary storage space. In operation 1022, a moving average method is performed with respect to a depth image of the stored first input frame and a depth image of a second input frame. After that, In operation 1023, a background image of the previous frame is generated. In operation 1024, the generated background image of the previous frame is fed as an input signal to the background image generator unit 120. In addition, a value of pixel having a depth value of "0" in the depth image of the second input frame is allotted as a maximum value before the generation of the background image of the previous frame.

Figure 13:
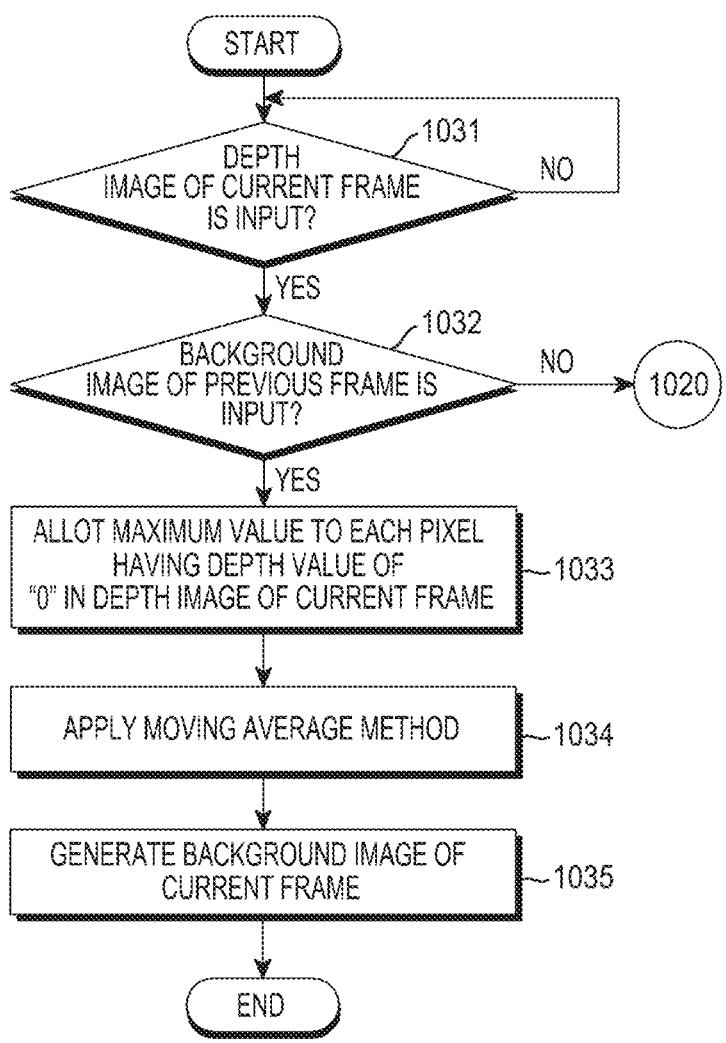
FIG. 13 is a flowchart illustrating a procedure of data processing of a background image generator unit, according to an embodiment of the present disclosure.

FIG. 13 is a flowchart illustrating a procedure of data processing of a background image generator unit according to an embodiment of the present disclosure.

Referring to FIG. 13, in operation 1031, the background image generator unit 120 determines whether a depth image of a current frame is input. If a depth image of a current frame is not input, the background image generator unit 120 waits for an input of a depth image of a current frame.

If a depth image of a current frame is input, in operation 1032, it is determined whether a background image of a previous frame exists in the input signals. If a background image of a previous frame is not input, the sequence proceeds to the operation 1020, as shown in FIG. 12, to generate a background image of a previous frame. If a depth image of a current frame and a background image of a previous frame are input, in operation 1033, each pixel having a depth value of "0" in the depth image of the current frame is allotted as a maximum value. Next, in operation 1034, a moving average method is performed with respect to the depth image of the current frame in which each pixel having a depth value of "0" is allotted as a maximum value and the background image of the previous frame. Here, the moving average method is performed to be applied with a weighted value. The weighted value may be pre-set and may be re-set by a user. After the performance of the moving average method is completed, in operation 1035, a current background image reflecting the depth image of the current frame be generated to be output.

Figure 14:
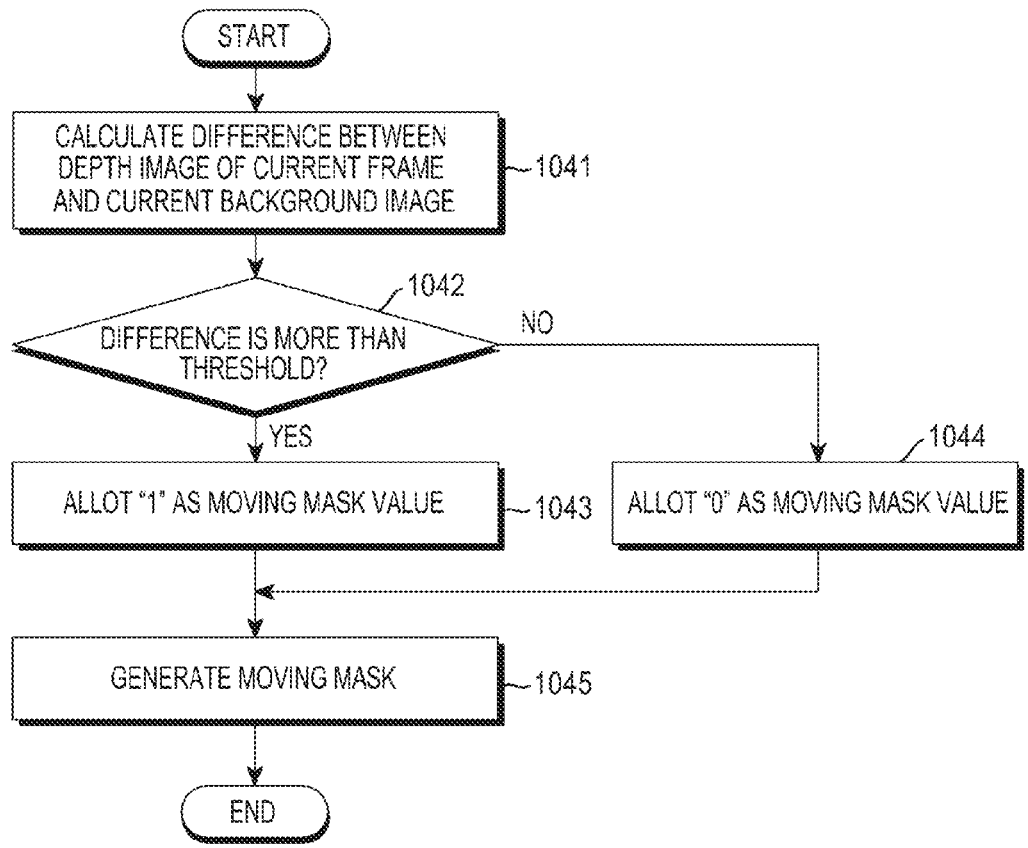
FIG. 14 is a flowchart illustrating a procedure of data processing of a moving mask generator unit, according to an embodiment of the present disclosure.

FIG. 14 is a flowchart illustrating a procedure of data processing of a moving mask generator unit, according to an embodiment of the present disclosure.

Referring to FIG. 14, in operation 1041, a moving mask generator unit 130 receives input signals of a depth image of a current frame in which each pixel having a depth value of "0" is allotted as a maximum value, and a current background image. After the two signals are input, a difference between the two signals is calculated. When the calculation of the difference is completed, in operation 1042, it is determined whether the calculated difference is more than a predetermined threshold. If the calculated difference is more than a predetermined threshold, then in operation 1043, "1" is allotted as a value of the moving mask. If the calculated difference is less than or equal to a predetermined threshold, then in operation 1044, "0" is allotted as a value of the moving mask. The moving mask values are allotted as "0" and "1" through the operations 1042 to 1044, and then in operation 1045, a moving mask is generated to be output. For example, the moving mask generator unit 130 generates a moving mask of a binary image including information of moving areas with the values of "0" and "1" to be output.

Figure 15:
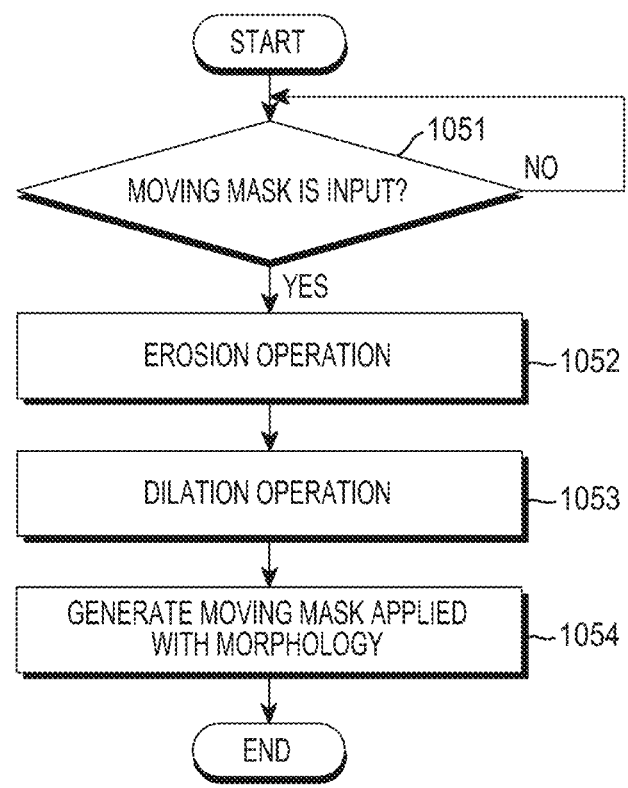
FIG. 15 is a flowchart illustrating a procedure of data processing of a moving mask morphology applying unit, according to an embodiment of the present disclosure.

FIG. 15 is a flowchart illustrating a procedure of data processing of a moving mask morphology applying unit, according to an embodiment of the present disclosure.

Referring to FIG. 15, in operation 1051, a moving mask morphology applying unit 140 determines whether a moving mask is input. If a moving mask is not input, the moving mask morphology applying unit 140 waits for an input of a moving mask.

If a moving mask is input, in operation 1052, an erosion morphology operation is performed with respect to the input moving mask. After the erosion operation is performed, in operation 1053, a dilation morphology operation is performed. With the dilation operation, in operation 1054, a moving mask applied with the morphology from which noise components are eliminated is generated to be output. Here, although an opening operation where the dilation morphology operation is performed after the erosion operation is performed in this embodiment, the present disclosure is not limited to this, and noise components be eliminated by performing at least one of an erosion operation, a dilation operation, an opening operation, a closing operation, a top hat operation, a well operation, a morphology gradient operation, and a smoothing operation.

Figure 16:
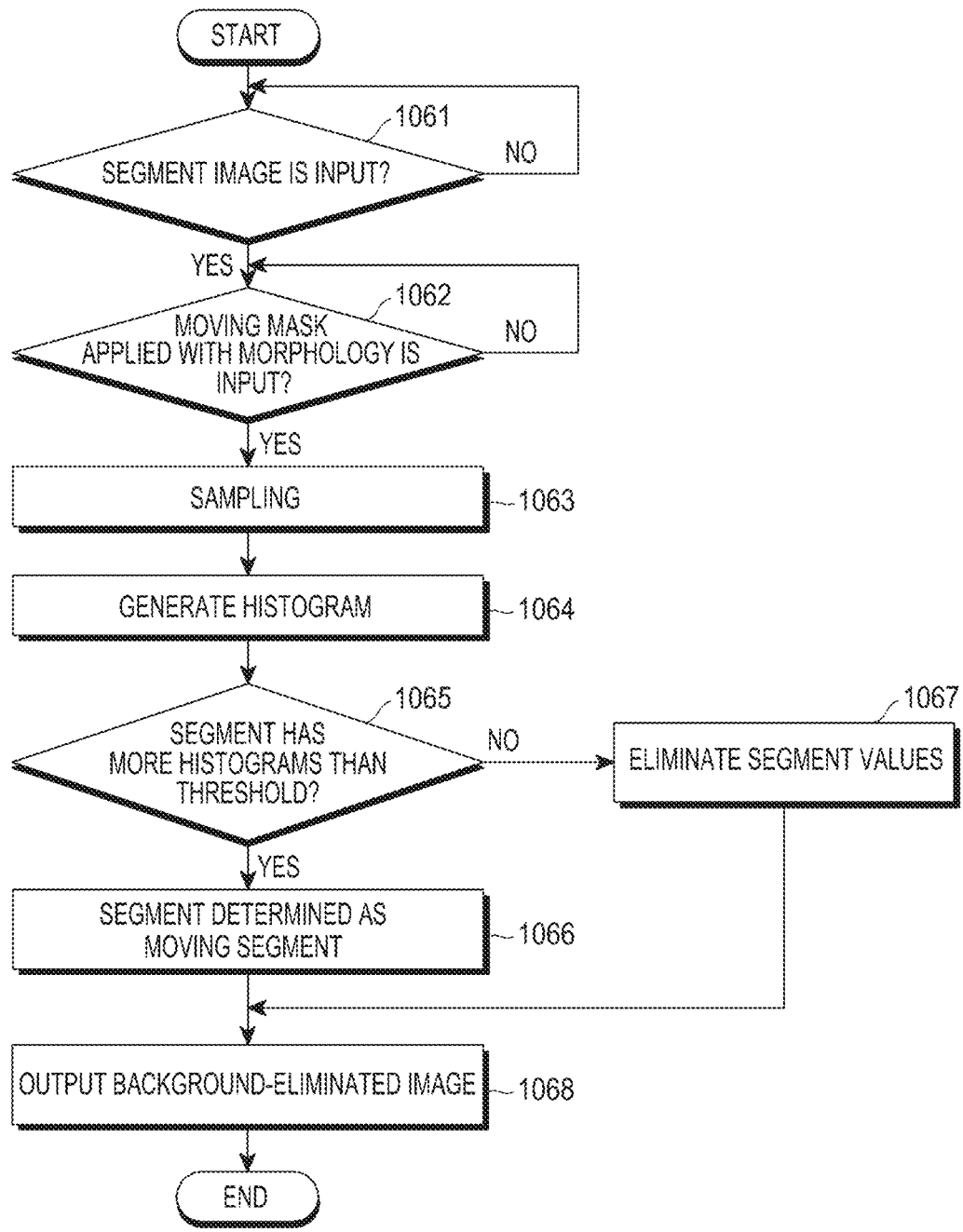
FIG. 16 is a flowchart illustrating a procedure of data processing of a moving segment histogram generator unit, according to an embodiment of the present disclosure.

FIG. 16 is a flowchart illustrating a procedure of data processing of a moving segment histogram generator unit, according to an embodiment of the present disclosure.

Referring to FIG. 16, in operation 1061, a moving segment histogram generator unit 150 determines whether a segment image is input. If a segment image is not input, the moving segment histogram generator unit 150 waits for an input of a segment image.

If a segment image is input, in operation 1062, it is determined whether a moving mask applied with the morphology is input. If a moving mask applied with the morphology is not input, the moving segment histogram generator unit 140 waits for an input of a moving mask applied with the morphology. If a moving mask applied with the morphology is input, in operation 1063, a sampling is performed with respect to the input segment image and the moving mask applied with the morphology. In operation 1064, histograms corresponding to moving parts (areas) in the dept image are generated. In operation 1065 it be determined whether the number of the generated histograms of each segment is more than a predetermined threshold. If the number of the histograms of a segment is more than a predetermined threshold, then in operation 1066, the corresponding segment is determined to be a moving segment. If the number of the histograms of a segment is less than a predetermined threshold, then in operation 1067, the corresponding segment is determined not to move and then is eliminated. In operation 1068, an image determined from a moving segment, from which a background is eliminated, is generated to be output.

A method for detecting a moving object using a depth map according to an embodiment of the present disclosure may be implemented in the form of program instructions which can be performed by various computing devices to be thereby recorded in a non-transitory computer-readable recording medium. The non-transitory computer-readable recording medium may include program instructions, data files, and data structures alone or a combination thereof. The program instructions recorded in the recording medium may be specially designed and configured for the present disclosure, or be something well-known to those skilled in the field of computer software. The non-transitory computer-readable recording medium may include magnetic media such as hard disks, floppy disks and magnetic tapes, optical media such as a Compact Disc Read-Only Memory (CD-ROM) and a Digital Versatile Disc (DVD), magneto-optical media such as floptical disks, and hardware devices such as a Read-Only Memory (ROM), a Random Access Memory (RAM) and a flash memory, which are specially configured to store and perform program instructions. Further, the program instruction includes a machine language code generated by a compiler and a high-level language code executable by a computer through an interpreter and the like. The hardware devices may be configured to operate as one or more software modules to perform the operations of the present disclosure, and vice versa.

As described above, although the present disclosure has described specific matters such as concrete components, the embodiments and the drawings are provided merely to assist in a general understanding of the present disclosure, and the present disclosure is not limited to the embodiments. Various modifications and changes can be made from the description by those skilled in the art.

Accordingly, the spirit and scope of the present disclosure should not be limited or determined by the above-described embodiments, and it should be noted that not only the claims which will be described below but also their equivalents fall within the spirit and scope of the present disclosure.

What is claimed is:

1. An apparatus for detecting a moving object using a depth image, the apparatus comprising:
    a segment image generator unit that generates a segment image to distinguish each object using a depth image of a current input frame;
    a background image generator unit that generates a current background image by applying a moving average method to the depth image and a background image of a previous input frame;
    a moving mask generator unit that generates a moving mask by comparing the depth image with the current background image to find moving parts in the depth image;
    a moving mask morphology applying unit that applies morphology operations to the moving mask and generates the moving mask from which noise components are eliminated; and
    a moving segment histogram generator unit that samples the moving mask from which the noise components have been eliminated and the segment image, generates histograms corresponding to the moving parts using the segment image and the moving mask, determines a moving segment through the histograms, and outputs an image from which a background is eliminated.

2. The apparatus of claim 1, wherein the segment image is generated by applying a labeling algorithm to the depth image of the current input frame.

3. The apparatus of claim 1, wherein the background image generator unit allots a maximum value to each pixel having a depth value of "0" in the depth image before the moving average method is applied.

4. The apparatus of claim 1, wherein the background image of the previous input frame is input to the background image generator unit again from the background image generator unit.

5. The apparatus of claim 1, wherein the moving mask is generated by determining a difference between the depth image and the background image,
    when the difference is more than a predetermined threshold, "1" is allotted as a value of the moving mask, and
    when the difference is less than or equal to a predetermined threshold, "0" is allotted as the value of the moving mask.

6. The apparatus of claim 1, wherein the background image of the previous input frame is input to the background image generator unit from the moving mask morphology applying unit.

7. The apparatus of claim 1, wherein the moving mask morphology applying unit eliminates the noise components from the moving mask by using an opening operation by which a dilation operation is applied to the moving mask after an erosion operation is applied to the moving mask.

8. The apparatus of claim 1, wherein the moving segment histogram generator unit adjusts a ratio of sampling.

9. The apparatus of claim 1, wherein the histograms are generated from values of segments at same locations as coordinates of the moving parts.

10. The apparatus of claim 1, wherein when a number of the histograms is greater than or equal to a predetermined threshold, a segment is determined to be the moving segment, and when the number of the histograms is less than the predetermined threshold, the segment is determined to be a non-moving segment.

11. A method for detecting a moving object using a depth image, the method comprising the operations of:
  generating a segment image to distinguish each object using a depth image of a current input frame;
  generating a current background image by applying a moving average method to the depth image and a background image of a previous input frame;
  generating a moving mask by comparing the depth image with the current background image to find moving parts in the depth image;
  applying morphology operations to the moving mask to generate a moving mask from which noise components are eliminated;
  sampling the moving mask from which the noise components have been eliminated and the segment image;
  generating histograms corresponding to the moving parts using the segment image and the moving mask; and
  determining a moving segment through the histograms.

12. The method of claim 11, wherein the segment image is generated by applying a labeling algorithm to the depth image of the current input frame.

13. The method of claim 11, further comprising allotting a maximum value to each pixel having a depth value of "0" in the depth image before the background image is generated.

14. The method of claim 11, wherein generating the current background image further comprises inputting the previous input frame again and generating the background image of the previous input frame.

15. The method of claim 11, wherein the moving mask is generated by determining a difference between the depth image and the background image,
  when the difference is more than a predetermined threshold, "1" is allotted as a value of the moving mask, and
  when the difference is less than or equal to a predetermined threshold, "0" is allotted as the value of the moving mask.

16. The method of claim 11, wherein the background image of the previous input frame is generated in applying the morphology operations and is input for generating the current background image.

17. The method of claim 11, wherein in applying the morphology operations, the noise components are eliminated from the moving mask by using an opening operation by which a dilation operation is applied to the moving mask after an erosion operation is applied to the moving mask.

18. The method of claim 11, wherein in sampling the moving mask, a ratio of sampling is adjustable.

19. The method of claim 11, wherein in generating the histograms, the histograms are generated from values of segments at same locations as coordinates of the moving parts.

20. The method of claim 11, wherein in determining the moving segment, when a number of the histograms is greater than or equal to a predetermined threshold, a segment is determined to be the moving segment, and when the number of the histograms is less than the predetermined threshold, the segment is determined to be a non-moving segment.

21. A non-transitory computer-readable recording medium having recorded thereon, a computer program for executing a method of detecting a moving object using a depth image, the method comprising:
  generating a segment image to distinguish each object using a depth image of an current input frame;
  generating a current background image by applying a moving average method to the depth image and a background image of a previous input frame;
  generating a moving mask by comparing the depth image with the current background image to find moving parts in the depth image;
  applying morphology operations to the moving mask to generate a moving mask from which noise components are eliminated;
  sampling the moving mask from which the noise components have been eliminated and the segment image;
  generating histograms corresponding to the moving parts using the segment image and the moving mask; and
  determining a moving segment through the histograms.

* * * * *